US006529727B1

United States Patent
Findikli et al.

(10) Patent No.: US 6,529,727 B1
(45) Date of Patent: Mar. 4, 2003

(54) AUTOMATIC EXPIRATION OF WIRELESS COMMUNICATION SERVICE SUBSCRIPTIONS

(75) Inventors: Nadi S. Findikli, Cary, NC (US); Inderpreet S. Ahluwalia, Chapel Hill, NC (US); Hans Carlsson, Cary, NC (US); Annika B. Lindh, Cary, NC (US); Alex K. Raith, San Diego, CA (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/390,817

(22) Filed: Sep. 7, 1999

(51) Int. Cl.$^7$ ................................................ H04M 1/66
(52) U.S. Cl. ..................... 455/411; 455/435; 455/433
(58) Field of Search ................................ 455/435, 433, 455/407, 408, 409, 418, 419, 414, 551, 410, 411

(56) References Cited

U.S. PATENT DOCUMENTS

| 5,303,285 | A | * | 4/1994 | Kerihuel et al. | ......... 379/114.2 |
| 5,815,807 | A | | 9/1998 | Osmani et al. | |
| 5,875,394 | A | * | 2/1999 | Daly et al. | ................. 340/5.74 |
| 5,956,636 | A | * | 9/1999 | Lipsit | ......................... 455/411 |
| 6,021,327 | A | * | 2/2000 | Nguyen et al. | ............. 455/432 |
| 6,243,574 | B1 | * | 6/2001 | McGregor et al. | ..... 379/114.01 |
| 6,370,373 | B1 | * | 4/2002 | Gerth et al. | ................ 380/250 |

FOREIGN PATENT DOCUMENTS

| EP | 0869693 A1 | 3/1998 |
| EP | 0977449 A1 | 7/1999 |
| WO | WO 92/19078 | 10/1992 |
| WO | WO 97/42783 | 11/1997 |

* cited by examiner

Primary Examiner—Daniel Hunter
Assistant Examiner—Nick Corsano
(74) Attorney, Agent, or Firm—Coats & Bennett, P.L.L.C.

(57) ABSTRACT

A method and apparatus for performing over-the-air activation for wireless communications service subscriptions within a wireless communications system. The method includes providing a plurality of subscription modules each having a unique identifier that corresponds to a plurality of non-activated service subscriptions. An activation period is established for each of the non-activated service subscriptions within which the corresponding subscriptions must be activated or deleted from the system. A list of unique identifiers and their associated activation periods is stored in the wireless communications system. To activate the subscription, a subscription module is mated with a mobile equipment device. An over-the-air activation request is transmitted to the wireless communications system that includes the unique identifier associated with said selected subscription module. The service subscription associated with the unique identifier is activated when the unique identifier is stored on the list and the activation period is valid.

20 Claims, 6 Drawing Sheets

AUTOMATIC EXPIRATION OF WIRELESS COMMUNICATION SERVICE SUBSCRIPTIONS

BACKGROUND OF THE INVENTION

The present invention relates to wireless communications and, more specifically, to a method of activating subscriptions for wireless communications service.

Subscribers of wireless communications services, such as cellular telephone users, typically purchase or otherwise secure wireless service from a service provider (a "subscription"). "Activation" is the process of initially setting up the wireless communications device so it can operate in the wireless communications system. In the present art, there is no particular time period within which an as-yet un-activated subscription must be activated. However, service providers may wish to limit the time period in which a particular subscription may be activated, such as to limit their exposure on special promotions, to encourage immediate use, or for a variety of other reasons.

Each service provider has their own system that users access for sending and receiving messages. The term "system" is defined as the equipment provided by each service provider necessary for a user to send and receive communications. Within a geographic area, there may be numerous service providers and numerous systems. Various systems may communicate with each other to form a network. Preferably, the network helps users within different systems to successfully communicate with one another allowing for the user to send and receive communications throughout a large geographic area.

Each system includes a one or more authentication centers (AUC) that store information relating to that system's subscriptions. Each time the subscription registers with the system, the AUC preferably verifies that the request is legitimate before allowing the subscription to access the system. Even when AUC's are spread throughout the system, each user will typically have a "home" AUC where their subscription information is maintained. Preferably, the home AUC for each user is the one geographically most convenient to the user so as to minimize the need for the exchange of subscription information within the system each time the subscription registers.

Each service subscription is assigned an identifier that allows for identification by the system. Prior to activation of the subscription, the system may not know the home AUC and therefore stores the identifier at each AUC throughout the system. It is typically not until the user activates his or her subscription that the system determines the home AUC. There is a substantial burden on the system to maintain the records of the as-yet un-activated subscriptions at each AUC. Once the subscription is activated and a home AUC is determined, there should be some manner of removing the corresponding records from the non-home AUCs so that each AUC does not become burdened with excessive subscription records that are not necessary to be maintained.

Thus, there is a need for an activation procedure that will allow for time periods to be established within which the particular subscription must be activated. Preferably, but not necessarily, such a procedure would additionally provide a simple and convenient method of purging old data records for non-activated subscriptions.

SUMMARY OF THE INVENTION

The present invention is directed to a method of over-the-air activation for wireless communications service subscriptions within a wireless communications system. The method includes providing a plurality of subscription modules each having a unique identifier that corresponds to a plurality of non-activated service subscriptions. An activation period is established for each of the non-activated service subscriptions within which the corresponding subscriptions must be activated or subsequently deleted from the system. A list of unique identifiers and their associated activation periods is stored in the wireless communications system. To activate the subscription, a subscription module is mated with a mobile equipment device. An over-the-air activation request is transmitted to the wireless communications system that includes the unique identifier associated with said selected subscription module. The service subscription associated with the unique identifier is activated when the unique identifier is stored on the list and the activation period is valid.

A second method is further disclosed that includes establishing a plurality of subscription accounts that each include a serial number and an activation period. A first database is created at a number of authentication centers within the wireless communications system. Each of the first databases includes a record of each subscription account having the corresponding serial number and activation period. The wireless communications system monitors each of the databases and deletes the records having expired activation periods. When an activation request is received for activating one of the subscription accounts, the system determines that the serial number of the request is contained within the first database and the activation period is valid. The record is then flagged as activated and is maintained within the database.

Preferably within the second method, a home authentication center is established and the record is deleted from each of the remaining authentication centers. At the home authentication center, the activated records may be stored at a second database.

The invention further includes a wireless communications subscription module. The module includes a unique identifier and an activation or validity period that defines the time period in which the subscription should be activated. The module is designed to mate with a mobile equipment unit for transmitting information to the wireless communication system. Preferably, the unique identifier corresponds to an initially non-activated service subscription and the validity period corresponds to the time for activating the subscription.

The invention is also directed to a wireless communications device for mating with a subscription module. The device includes a transceiver for transmitting and receiving signals from the wireless communications network, a port for receiving the subscription module, and a means for determining the current time. The device further includes a processor for fetching an activation period from the subscription module and comparing the activation period with the current time. Preferably, the device will reject an activation request when the current time is beyond the activation period.

The invention also includes a wireless communications system that communicates with other communications systems. The system includes at least one database including a list of unique identifiers corresponding to a plurality of non-activated service subscriptions and an activation end-date associated with each of the unique identifiers. During a request for activating one of the non-activated service subscriptions, the system consults the list and rejects the request if the request occurs after the activation end-date corresponding to the service subscription attempting to activate.

DETAILED DESCRIPTION

For clarity, the present discussion will assume that the wireless communications mobile terminal 10 is a cellular telephone. However, it is to be understood that other wireless communications mobile terminals, such as personal communications assistants, pagers, and the like, are also within the scope of the present invention. Further, the present invention will be discussed in the context of an ANSI-41/ANSI-136 system. However, the present invention is not so limited, but may instead apply to terrestrial GSM, IS-95, CDMA, WCDMA, cdma 2000, and similar systems, and also to satellite based systems.

Figure 1:
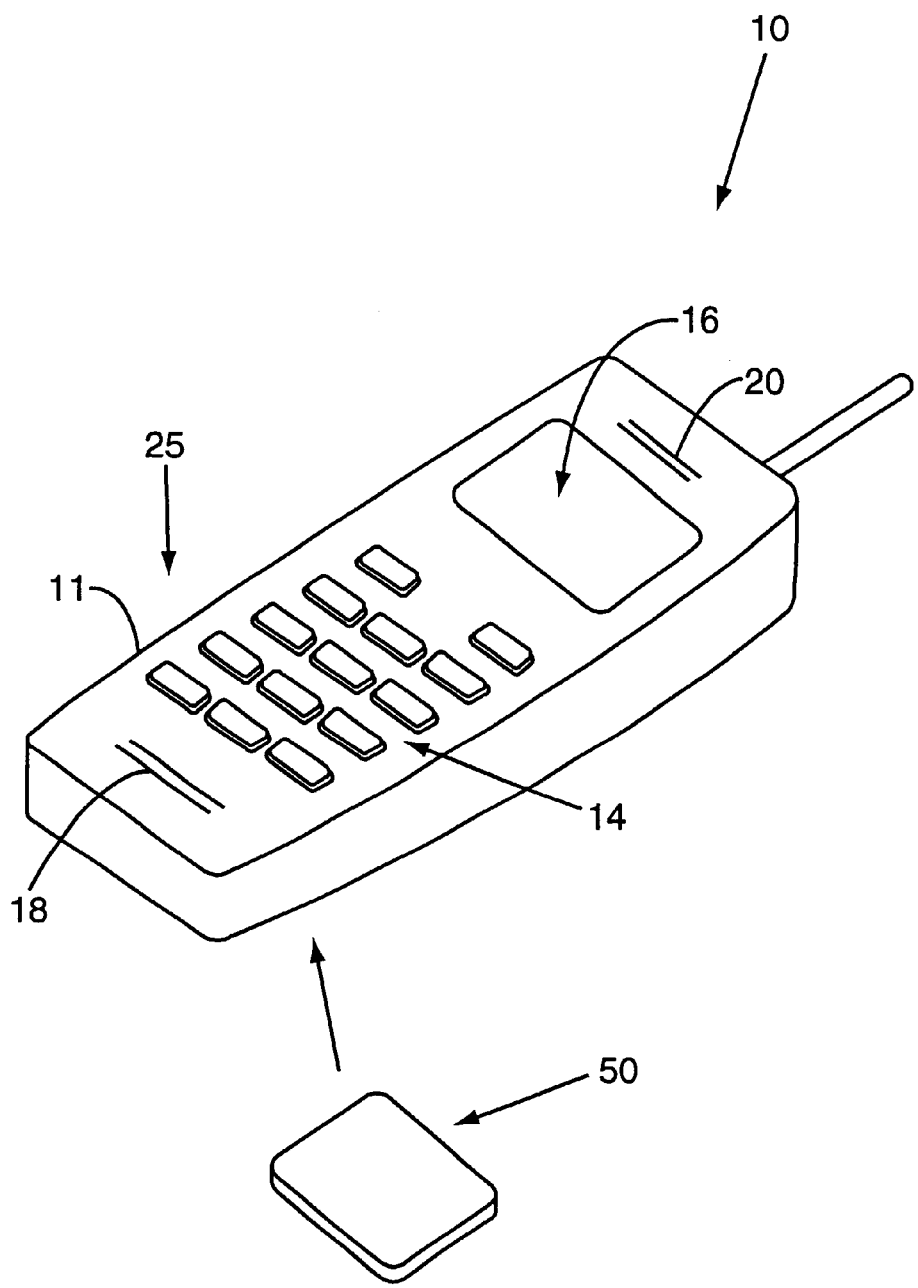
FIG. 1 is a perspective view of a mobile terminal and an identification module.
Figure 2:
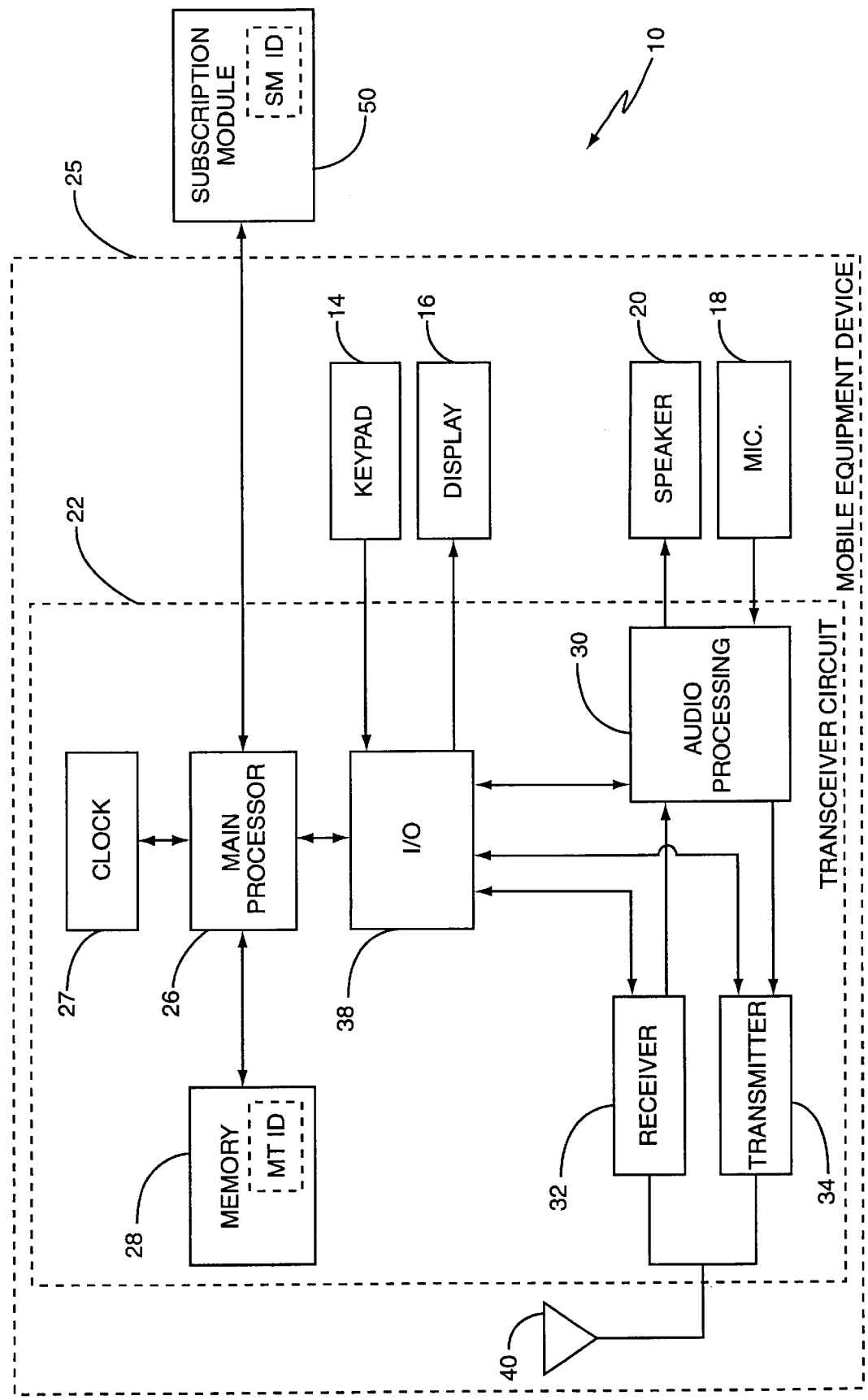
FIG. 2 is a schematic illustration of the components within the mobile terminal.

The phone 10 is a fully functional mobile transceiver capable of transmitting and receiving radio frequency signals as illustrated in FIG. 1. The mobile telephone 10 typically includes a main unit 25, sometimes referred to as the mobile equipment (ME), and an identification module 50. The main unit 25 includes a housing 11 that contains a keypad 14, a display 16, a microphone 18, and a speaker 20. The keypad 14, display 16, microphone 18, and speaker 20 interface with a conventional transceiver circuit 22 generally disposed inside the housing 11 of the main unit 25 as illustrated in FIG. 2. The keypad 14 allows the operator to dial numbers, enter commands, and select options. The display 16 allows the operator to see dialed digits, stored information, and call status information. Audio processing circuits 30 provide basic analog audio outputs to the speaker 20 and accept analog audio inputs from a microphone 18.

The transceiver circuit 22 includes a main controller 26, such as a microprocessor, for controlling the overall operation of the mobile telephone 10. The transceiver circuit 22 further includes memory 28 for storing programs and data used by the mobile telephone 10, a clock 27 for determining the current time, audio processing circuits 30, a receiver 32, and a transmitter 34. Input/output circuits 38 interface the control unit 26 with the keypad 14, display 16, audio processing circuits 30, receiver 32, and transmitter 34. The receiver 32 and transmitter 34 connect to a common antenna 40 to receive and transmit signals over an RF channel. Because the details of the general construction and operation of the main unit 25, including transceiver circuit 22, are well-known in the art, they will not be further discussed herein except as appropriate to place the invention in context.

Attached to the main unit 25 is a subscription module 50 that includes subscription information. While the subscription module 50 may include memory and other electronics for performing a variety of functions, for purposes of this invention the subscription module contains a unique identifier, referred to herein as the subscription module identifier. Likewise, the main unit 25 includes a unique identifier, referred to herein as the mobile equipment identifier. The mobile equipment identifier is preferably hard-coded into a portion of the transceiver circuit 22 and should not be alterable by the user under normal circumstances. The mobile equipment identifier may be stored in a non-volatile portion of memory 28, or may be stored elsewhere.

Figure 3:
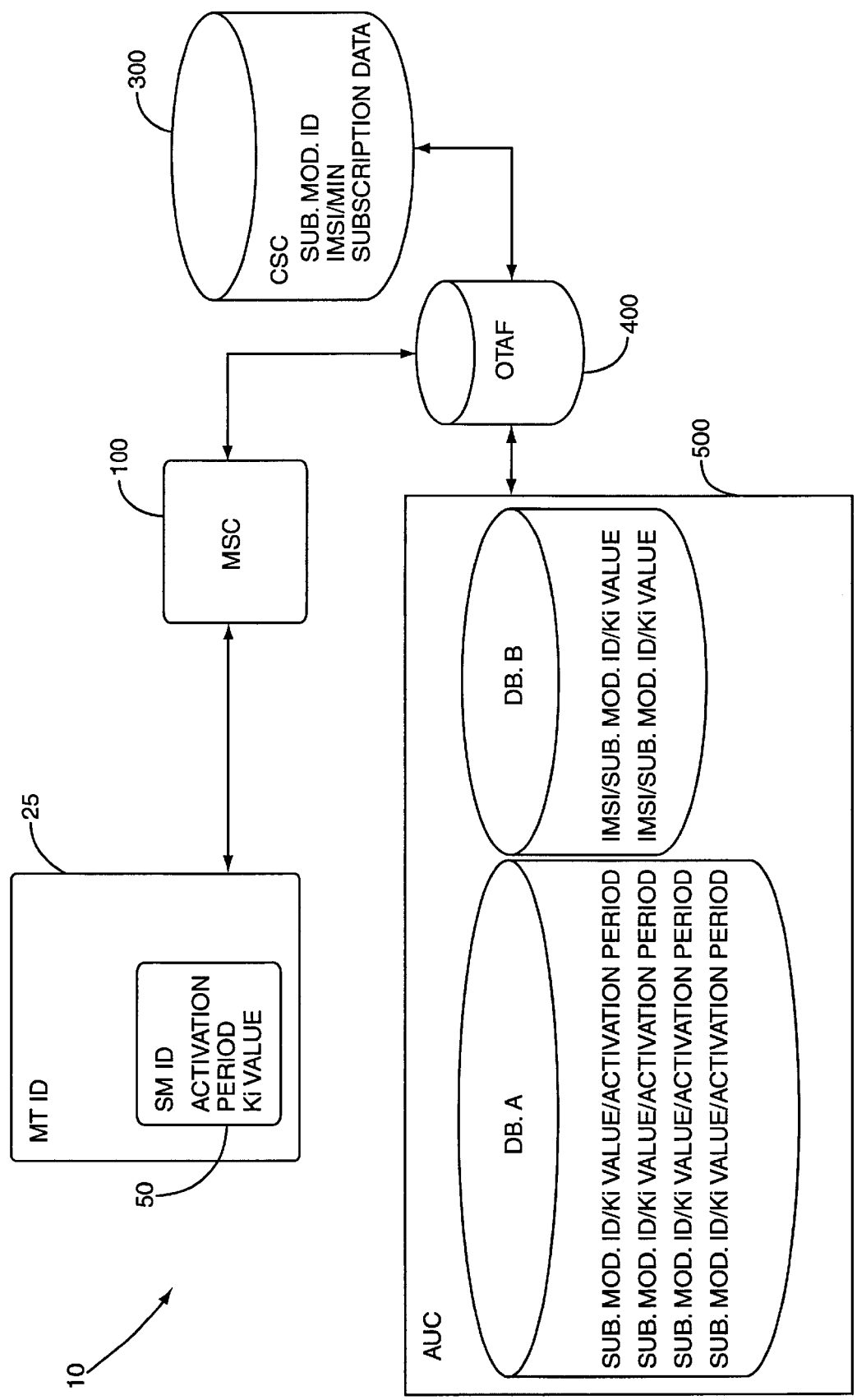
FIG. 3 is a schematic illustration of the activation of a subscription within the AUC.

The main components of a wireless communications system are illustrated in FIG. 3. A Mobile Switching Center 100 (MSC) provides for transferring information between the mobile terminals 10 and the other components of the system. A Customer Service Center 300 (CSC) stores information regarding the subscription including subscription data, and identifiers that provide for the system to recognize each subscription. The AUC 500 includes a first database DB.A containing a first set of as-yet-un-activated subscriptions. A second database DB.B contains information identifying activated subscriptions and is used for the registration processes as is commonly known and used in the art. Other architectures, such as for General Packet Radio Service (GPRS), are also possible which may or may not include an MSC 100.

Figure 4:
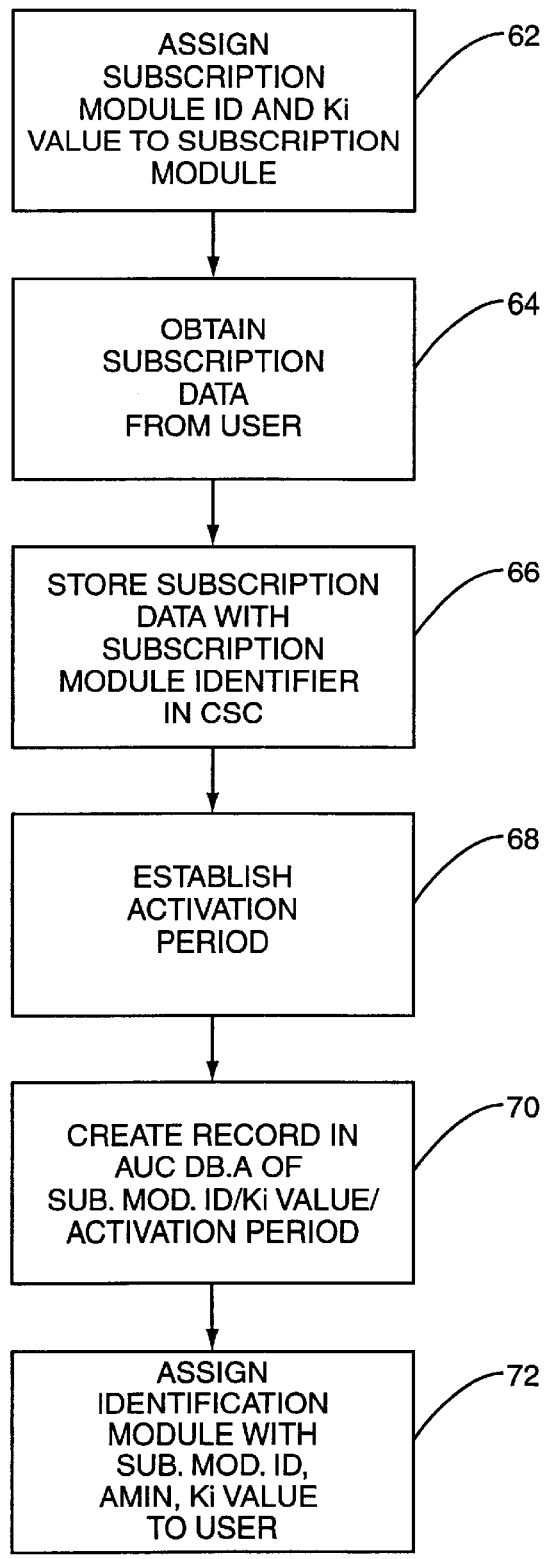
FIG. 4 is a flowchart illustrating establishing a subscription within the network.

In order to have cellular service, the user must initialize a service subscription from a wireless communications service provider. FIG. 4 illustrates the steps of initializing the subscription. The subscription module 50 is created and assigned a unique subscription module identifier and Ki value (block 62). The Ki value is a secret security key value stored at the subscription module and the AUC for authenticating the subscription at the activation and during subsequent registrations. A user establishes a subscription and selects the parameters of the subscription such as calling options, paging routines, etc., generally designated as "subscription data" (block 64) which are stored at the CSC 300 along with the subscription module identifier (block 66). An activation period is established for the subscriber to activate the subscription and may be established for any length of time (block 68). The activation period may be established by the user or by the service provider. From a system perspective, the activation period should be as short as possible to keep from storing and monitoring large amounts of records within each AUC. However, a user may require a longer activation period for convenience. A record is also created in each AUC within the first database DB.A containing the subscription module identifier, the Ki value, and the activation period (block 70). The user is provided a subscription module 50 containing the subscription module identifier and Ki value that provides for the user to activate and use the subscription (block 72). The sequence of establishing the records within the CSC and each AUC may vary and these other sequences are considered to be included within the scope of the present invention. By way of example, the record in each AUC may be created at the time the subscription module is assigned a subscription module identifier (see block 62), and the activation period added at a later time to the already existing record. Additionally, the activation period may be determined (block 68) and the record created in DB.A (block 70) prior to the user establishing the subscription (block 64).

The subscription module 50 may also contain the activation period. Within this embodiment, the Mobile Equipment (ME) 25 may be equipped to allow a keypad command to read the activation period from the subscription module 50, along with any other auxiliary information, and display the information on the display 16. Thus, the user or a service technician may check the activation period without performing any activation. The ME 25, or other more specialized equipment, may be used for this purpose.

Figure 5:
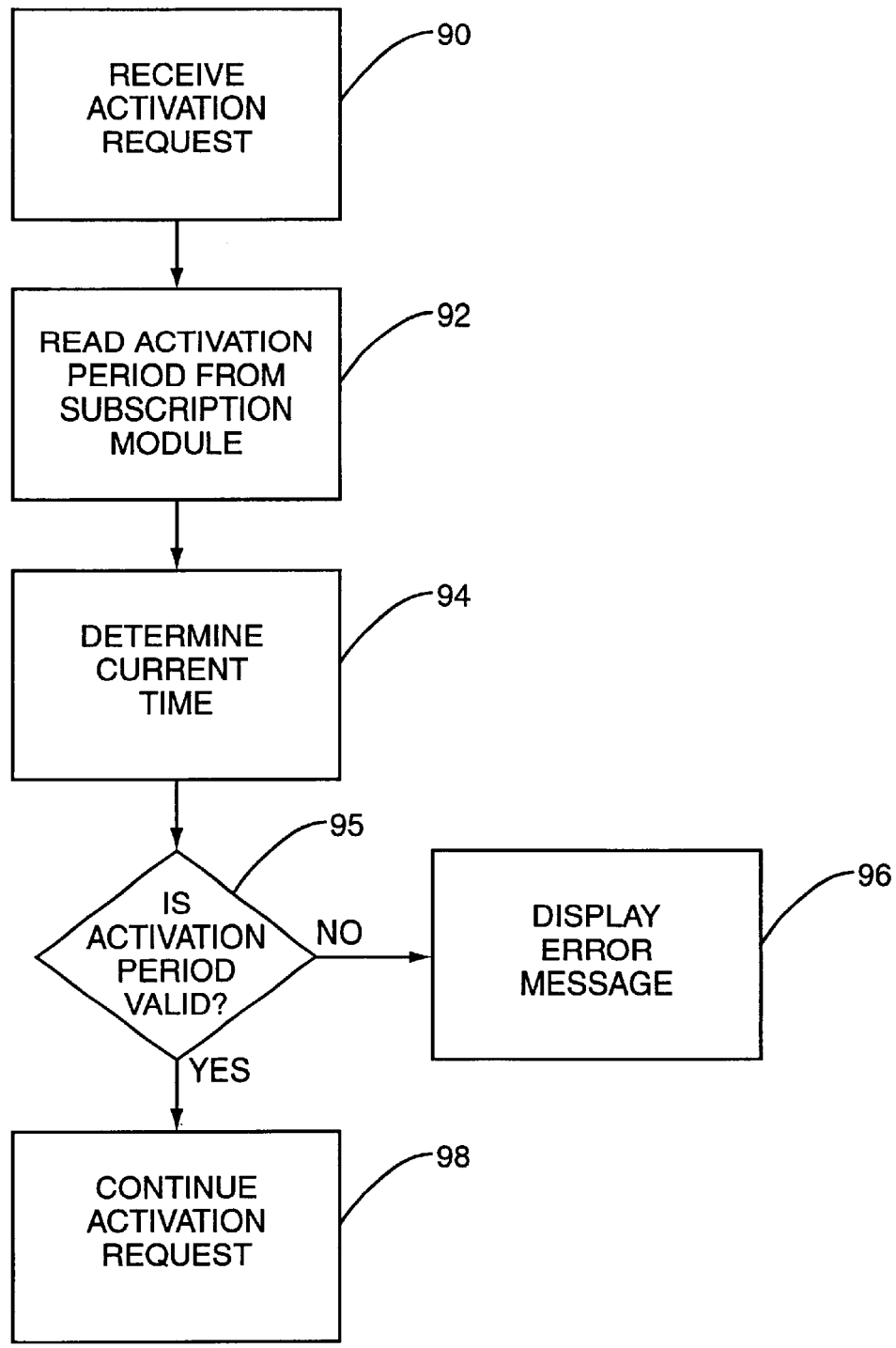
FIG. 5 is a flowchart illustrating the mobile equipment determining the validity of the activation period.

If the ME 25 is able to determine the current time, the ME may also be equipped to determine if the activation period is still valid as illustrated in FIG. 5; When the ME 25 receives an activation request (block 90), it will read the activation period stored on the subscription module (block 92). The ME 25 will then determine the current time (block 94). The ME 25 may refer to the internal clock 27, or may rely on a signal broadcast from the system indicating the current time. When determining the time from a system signal, the ME 25 may regularly receive the current time signal, or may only receive the signal during a particular function, such as upon the receipt of an activation request from the user. The ME 25 compares the current time with the activation period and determines whether the activation period is still valid (block 95). If the ME 25 determines that the activation period is not valid, an error message will be displayed on the display screen informing the user (block 96) and denying access to the system. If the ME 25 determines the activation period is still valid, the activation request will be transmitted to the MSC (block 98).

After the subscription has been initialized, the system periodically inspects the records contained within each AUC 500 and determines whether the activation periods are valid. If the activation period has expired, the record is purged from each AUC 500 within the system. If the activation period is still valid, the record remains within the database DB.A in each AUC 500. The system may purge the records at any interval depending upon the requirements and parameters of the system. Preferably, the purging is performed during off-peak hours when the system is not usually under a high user demand.

The activation process may, in some instances, involve substantial manual entry of information by a service provider employee. However, a faster and more accurate approach is for the system to download at least a portion of the necessary information directly to the mobile equipment 25 and subscription module 50. One such approach is known as Over-the-Air Activation which is a procedure within ANSI-41/ANSI-136 that allows a user to activate his/her cellular subscription by dialing a feature code and some additional digits directly from previously non-activated mobile equipment. See the TIA/EIA-136-720-A standard, which is incorporated herein by reference.

Figure 6:
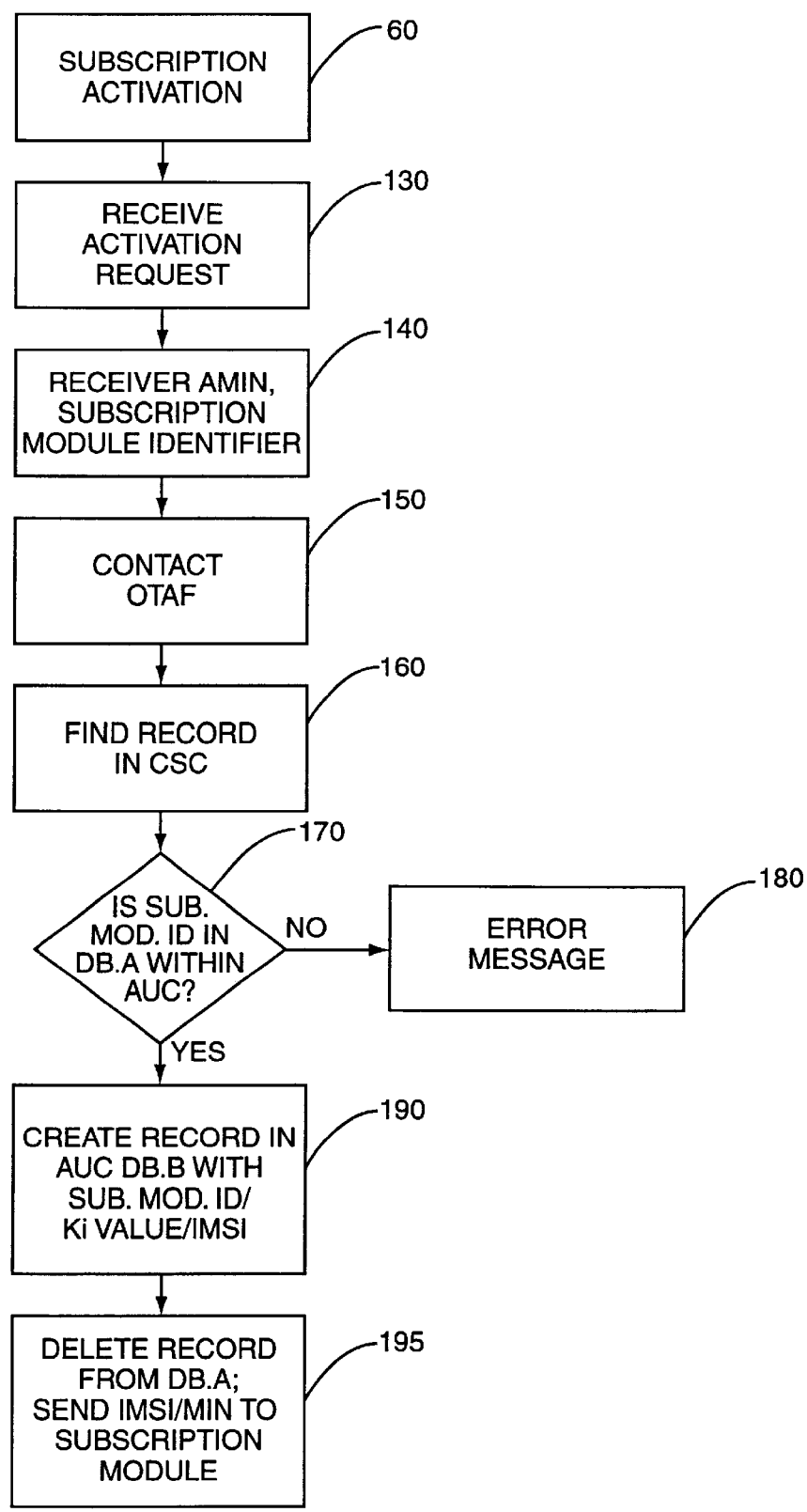
FIG. 6 is a flowchart illustrating the steps for an On-the-Air Activation according to the present invention.

One process of on-the-air activation according to the present invention is illustrated in FIG. 6. After the subscription has been initialized (block 60), the activation request is sent by the user inserting or otherwise mating the subscription module 50 with the ME 25 and using the transceiver circuit 22 to signal the MSC (block 130). Prior to a successful activation, the subscription is usually not assigned a Mobile Station Identification Number (MIN) or an International Mobile Station Identity (IMSI). Because at least one of these identifications are normally necessary to access the system, the mobile terminal 10 that is over-the-air activating a subscription generates a temporary MIN, called the Activation MIN (AMIN), that is constructed by using the algorithm known in the art based on the subscription module identifier.

The MSC 100 receives the information (block 140) and identifies an on-the-air activation request either based on the feature code that was dialed by the user, on the AMIN used for system access, or any other signal indicating activation. The information transmitted to the MSC 100 includes the subscription module identifier and the AMIN. Additionally, the activation period may also be transmitted to the MSC 100. When the MSC 100 notes the request, the MSC 100 notifies an Over-the-Air Function 400 (OTAF) that an activation has been initiated (block 150). The OTAF is the logical node that handles the activation request. The OTAF 400 searches the CSC 300 for the record containing the subscription module identifier and subscription data (block 160). An IMSI and/or MIN number may then be assigned to the subscription and the information saved with the corresponding record in the CSC 300. Alternatively, the IMSI and/or MIN may have been assigned at the initialization of the subscription and saved in the CSC 300 at that time.

The system searches DB.A within the AUC for the subscription module identifier (block 170). If the subscription module identifier is not found, an error message is displayed to the user indicating that the subscription information is incorrect or the activation period has expired (block 180). If the subscription module identifier is found within the DB.A, the subscription module identifier and Ki values are stored within the second database DB.B along with the IMSI/MIN or other pertinent information recovered from the CSC (block 190). The system may flag the subscription as being successfully activated by creating a new record in the DB.B, or the record may already exist in DB.B and the system may simply set an appropriate data flag. The record is then deleted from the DB.A and may be deleted from the other AUCs within the system. The records within the other AUCs may either be deleted concurrently as the subscription is activated, or may not be deleted until the periodic purging by the system. The IMSI/MIN and any other necessary information is transferred to the subscription module where it is saved in memory (block 195). Additionally, when the activation period is stored at the subscription module, it may be transmitted to the authentication center. This provides for a redundant check of the activation period and also provides the activation period in the event that it was incorrectly deleted from the authentication center prior to the activation request.

The discussion above has assumed that the subscription unique identifier is stored in a subscription module 50. However, it should be noted that the term "subscription module" as used herein merely means an identification module that includes a unique identifier, such as an subscription module identifier, that may be removably mated to any one of a plurality of mobile equipment devices that include the main transceiver for the wireless communications. Thus, the subscription module 50 need not conform to the GSM specifications, but in preferred embodiments it does. In a preferred embodiment, the subscription module 50 is a SIM card having a unique serial number. One skilled in the art will recognize that other embodiments may also be available and are considered within the scope of this invention.

The discussion above has assumed that each AUC 500 includes two different databases, DB.A. and DB.B; the use of these two databases was for illustrative purposes so as to separate the function of the two databases. However, the functions of the two databases may be combined into a single database without departing from the scope of the present invention.

The present invention may be carried out in other specific ways than those. herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of activating subscriptions in a wireless communication system comprising the steps of:
   receiving an activation request for a subscription;
   fetching an activation period associated with the subscription;
   determining a current time;
   comparing the current time against the activation period and denying the activation request when the current time is beyond the activation period; and
   prior to said receiving, joining a subscription module with a mobile equipment device and generating said activation request at said combined subscription module and mobile equipment device.

2. The method of claim 1, further including the mobile equipment device determining the current time through an internal clock.

3. The method of claim 1, further including the mobile equipment device determining the current time through broadcast signals from the system.

4. The method of claim 1, further including the mobile equipment device comparing the activation period with the current time and denying access to the system when the activation period is expired.

5. The method of claim 1 wherein said subscription module includes said activation period and wherein said mobile equipment device reads the activation period from said subscription module.

6. The method of claim 1 further including the system receiving the activation request and comparing the activation period and current time.

7. The method of claim 6 further including the system receiving the activation period as a part of the activation request.

8. The method of claim 1 wherein said activation period and current time each correspond to a date.

9. A method of over-the-air activation for wireless communications service subscriptions, comprising:
   providing a plurality of subscription modules, each module having a unique identifier corresponding to each of a plurality of non-activated service subscriptions;
   establishing an activation period for each of said non-activated service subscriptions within which the corresponding subscription must be activated;
   storing a list of said unique identifiers and their associated activation periods in at least one location in a wireless communications system;
   mating a selected subscription module to a mobile equipment device and initiating an over-the-air activation request including transmitting the unique identifier associated with said selected subscription module to said wireless communications system;
   activating said service subscription associated with said unique identifier if said unique identifier is on said list and said activation period for said non-activated service subscription is valid; and
   said wireless communications system automatically purging said list of unique identifiers whose corresponding activation periods have expired.

10. The method of claim 9 wherein said wireless communications system rejects said activation request if the unique identifier is no longer on said list.

11. The method of claim 9 further including assigning a security key value to each of said un-activated subscriptions and storing said security key values in the corresponding subscription modules and in said list prior to said activation request.

12. The method of claim 9 further including storing said list of said unique identifiers and their associated activation periods in a plurality of locations in said wireless communications system.

13. The method of claim 12 further including said wireless communications system purging said list of unique identifiers whose activation periods have expired from said plurality of locations.

14. A method of over-the-air activation for wireless communications service subscriptions, comprising:
   providing a plurality of subscription modules, each module having a unique identifier corresponding to each of a plurality of non-activated service subscriptions;
   establishing an activation period for each of said non-activated service subscriptions within which the corresponding subscription must be activated;
   storing a list of said unique identifiers and their associated activation periods in at least one location in a wireless communications system;
   mating a selected subscription module to a mobile equipment device and initiating an over-the-air activation request including transmitting the unique identifier associated with said selected subscription module to said wireless communications system;
   activating said service subscription associated with said unique identifier if said unique identifier is on said list and said activation period for said non-activated service subscription is valid; and
   checking said activation period at said mobile equipment device prior to transmitting said activation request to said wireless communications system and aborting said activation request if said activation period has expired.

15. The method of claim 14 further including storing the activation period of each non-activated service subscription on the corresponding subscription module.

16. The method of claim 15 further including sending the activation period stored in said subscription module to the wireless communications system during the activation request.

17. A method of activating wireless communications service subscriptions comprising the steps of:
   establishing a plurality of subscription accounts each having a fixed identifier and a corresponding activation period;
   creating a record for each of the subscription accounts within a first database at a plurality of authentication centers;
   deleting the records from each of the first databases after their activation period has expired;
   receiving an activation request for activating one of the subscription accounts, said activation request including said corresponding fixed identifier, and, in response to said activation request, flagging an activated subscription database record as activated if said corresponding fixed identifier is found within said first database; and
   deleting the record in the first database corresponding to said activation request substantially concurrently with said flagging of an activated subscription database record as activated.

18. The method of claim 17 further including creating a record, for at least some of said plurality of subscription accounts at a customer service center, each of the records includes one of the fixed identifiers and subscription data.

19. The method of claim 17 further including, in response to said activation request, sending a message to the source of said activation request indicating non-success of said activation request if said corresponding fixed identifier is not found within said first database.

20. A method of activating wireless communications service subscriptions within a wireless communications system comprising:

creating a plurality of non-activated service subscriptions;

storing records of said non-activated service subscriptions at a plurality of authentication centers;

receiving an activation request at one of said authentication centers to activate one of the non-activated service subscriptions;

matching the service subscription activation request with the non-activated service subscriptions maintained at one of said authentication centers;

activating the service subscription associated with said activation request and deleting the corresponding non-activated service subscription record at a remainder of the authentication centers; and assigning an activation period to each of said non-activated subscriptions and said wireless communication system deleting said records of said non-activated subscriptions at each of said plurality of authentication centers upon the expiration of the corresponding activation period.

* * * * *